US008909358B2

(12) United States Patent
Karnouskos

(10) Patent No.: US 8,909,358 B2
(45) Date of Patent: Dec. 9, 2014

(54) METHOD AND SYSTEM FOR COMPLEX SMART GRID INFRASTRUCTURE ASSESSMENT

(75) Inventor: Stamatis Karnouskos, Karlsruhe (DE)

(73) Assignee: SAP AG, Walldorf, DE (US)

( * ) Notice: Subject to any disclaimer, the term of this patent is extended or adjusted under 35 U.S.C. 154(b) by 0 days.

(21) Appl. No.: 13/486,341

(22) Filed: Jun. 1, 2012

(65) Prior Publication Data

US 2013/0325147 A1 Dec. 5, 2013

(51) Int. Cl.
*G05B 13/04* (2006.01)

(52) U.S. Cl.
USPC .............................................. 700/30; 700/286

(58) Field of Classification Search
None
See application file for complete search history.

(56) References Cited

U.S. PATENT DOCUMENTS

| | | | | |
|---|---|---|---|---|
| 6,785,592 | B1 * | 8/2004 | Smith et al. | 700/291 |
| 8,014,880 | B2 * | 9/2011 | Samardzija et al. | 700/17 |
| 8,060,259 | B2 * | 11/2011 | Budhraja et al. | 700/291 |
| 8,112,649 | B2 * | 2/2012 | Potkonjak | 713/320 |
| 8,417,360 | B2 * | 4/2013 | Sustaeta et al. | 700/28 |
| 2005/0256735 | A1 * | 11/2005 | Bayne | 705/1 |
| 2006/0111921 | A1 * | 5/2006 | Chang et al. | 705/1 |
| 2006/0241924 | A1 * | 10/2006 | Harper et al. | 703/7 |
| 2009/0281674 | A1 * | 11/2009 | Taft | 700/286 |
| 2010/0030881 | A1 * | 2/2010 | Moreira Sa de Souza et al. | 709/223 |
| 2010/0082125 | A1 * | 4/2010 | Pingel et al. | 700/47 |
| 2010/0123575 | A1 * | 5/2010 | Mittal et al. | 340/540 |
| 2010/0228854 | A1 * | 9/2010 | Morrison et al. | 709/224 |
| 2011/0061015 | A1 * | 3/2011 | Drees et al. | 715/771 |
| 2012/0029897 | A1 * | 2/2012 | Cherian et al. | 703/18 |
| 2012/0066030 | A1 * | 3/2012 | Limpert | 705/7.38 |
| 2012/0078683 | A1 * | 3/2012 | Mendiratta et al. | 705/7.29 |
| 2012/0109719 | A1 * | 5/2012 | Parmar et al. | 705/7.37 |
| 2012/0166001 | A1 * | 6/2012 | Park et al. | 700/287 |
| 2012/0316697 | A1 * | 12/2012 | Boardman et al. | 700/297 |
| 2013/0190939 | A1 * | 7/2013 | Lenox | 700/291 |

OTHER PUBLICATIONS

Karnouskos, et al. "Real world service interaction with enterprise systems in dynamic manufacturing environments." In L. Benyoucef and B. Grabot, editors, Artificial hztelligence Techniques for Networked Manufacturing Enterprises Management, No. ISBN 978-1-84996-118-9. Springer, 2010.*
Karnouskos, Stamatis, and Anastasia Izmaylova. "Simulation of web service enabled smart meters in an event-based infrastructure." Industrial Informatics, 2009. INDIN 2009. 7th IEEE International Conference on. IEEE, 2009.*
IBM, "Autonomic Network Performance Management System providing Efficient Data Collection" IPCOM000192206D IPCOM Publication Jan. 20, 2010.*

(Continued)

*Primary Examiner* — Ryan Jarrett
(74) *Attorney, Agent, or Firm* — Fountainhead Law Group PC

(57) ABSTRACT

An infrastructure assessment system integrates with a smart grid infrastructure at all layers of the infrastructure. Data may be collected across layers. Performance metrics may be monitored and simulations may be performed. Action items may be decided upon based on actual behavior of the infrastructure determined from the collected data and on predicted behavior from simulations of the infrastructure. The action items may then be dispatched to be performed on the infrastructure. The effect of the management actions can then be "acquired" by the system via detailed monitoring and can be used, for example, to measure the effectiveness of the decisions or recalibration of the whole system.

20 Claims, 6 Drawing Sheets

(56) References Cited

OTHER PUBLICATIONS

Marqués et al. "NOBEL—a neighborhood oriented brokerage electricity and monitoring system" In: 1st International ICST Conference on E-Energy, Oct. 14-15, 2010 Athens. Springer (2010).*
Savio et al. "Predicting Energy Measurements of Service-Enabled Devices in the Future Smartgrid," Computer Modelling and Simulation (UKSim), 2010 12th International Conference on , vol., No., pp. 450,455, Mar. 24-26, 2010.*
Federation of German Industries (BDI). Internet of Energy: ICT for energy markets of the future. BDI publication No. 439, Feb. 2010.
Stamatis Karnouskos, "The cooperative internet of things enabled smart grid." In Proceedings of the 14th IEEE International Symposium on Consumer Electronics, Braunschweig, Germany, Jun. 7-10, 2010.
Stamatis Karnouskos, "Cyber-Physical Systems in the SmartGrid." In IEEE 9th International Conference on Industrial Informatics (INDIN), Lisbon, Portugal, Jul. 26-29, 2011.
Stamatis Karnouskos, Per Goncalves Da Silva, and Dejan Ilic, "Assessment of high-performance smart metering for the web service enabled smart grid." In Second ACM/SPEC International Conference on Performance Engineering (ICPE'11), Karlsruhe, Germany., Mar. 14-16, 2011.
SmartGrids European Technology Platform. Smartgrids: Strategic deployment document for Europe's electricity networks of the future, Apr. 2010.

* cited by examiner

METHOD AND SYSTEM FOR COMPLEX SMART GRID INFRASTRUCTURE ASSESSMENT

BACKGROUND

Unless otherwise indicated herein, the approaches described in this section are not prior art to the claims in this application and are not admitted to be prior art by inclusion in this section.

The term "smart grid" is often used to refer technology that utility companies use to monitor and control the delivery and production/consumption of a resource such as electricity, gas, water, etc., using computer-based remote control and automation. The smart grid is empowered by information technology (IT) tools for monitoring and control. The smart grid envisions several sophisticated services, which heavily depend on near real-time monitoring of the assets and functionality they provide. However, we still face several problems when it comes down to assessment of the infrastructure, not to mention estimation of behavior. Today it is very difficult to: (i) anticipate the requirements for all of its layers e.g., of a smart metering deployment needed in hardware and software; and (ii) modify, on the fly, the infrastructure to guarantee envisioned constraints such as performance or quality of service (QoS). The smart grid promises a more versatile and intelligent network of collaborating actors that will eventually lead to better utilization of its resources in order to achieve goals such as energy efficiency. The smart grid is a cyber-physical system (CPS) that depends on IT and has spawned several traditional domains and (business) processes (e.g. industrial automation, smart metering, etc.) in an effort to deliver an optimized critical energy infrastructure and auxiliary services.

As users in the smart grid era will be able to not only consume but also produce energy (referred to as "prosumers"), the dynamics and complexity of the system increases. Information and communication technologies may be employed to provide insight to the prosumer's current and future activities that is not possible in the conventional grid. In the future, devices may no longer be single role devices that either only consume energy (e.g., a home appliance) or only produce energy (e.g., a photovoltaic panel), but rather will have interchangeable dual roles of energy consumer and energy producer, and hence the term "prosumer devices." A typical example of a prosumer device is the electric car, which consumes electricity when driven, and produces electricity that is stored when braking. A commonly described usage scenario involves a fleet of electric cars. While the cars are being driven or charged, they can be viewed as "consuming" energy. However, if the need arises, they can feed the energy stored in their batteries to the grid as providers.

As energy monitoring and management systems become increasingly integrated with enterprise systems, enterprise services will integrate information coming from highly distributed smart metering points in near real-time, process it, and take appropriate decisions. The decision making process can consider prosumer-specific behavioral information either measured, assumed, or explicitly provided by the prosumer. This will give rise to a new generation of applications that depend on "real-world" services which constantly hold actualized data as they are generated. Furthermore, the integration of potential future behavior of the prosumer may enable better correlation and analytics. Such information is usually not available at all, or in the best case only acquired by local systems (e.g., a building's energy management system), and over dedicated channels and proprietary interfaces that hinder further dissemination of the information.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
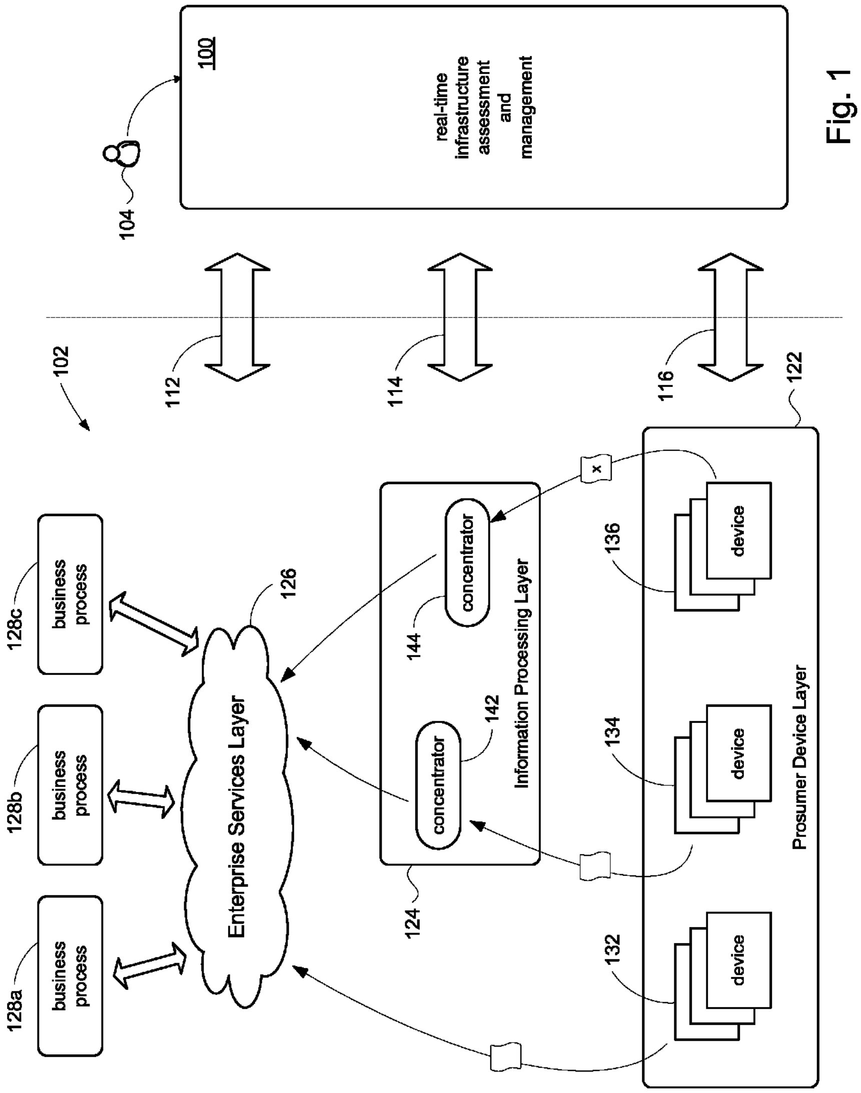
FIG. 1 is a high level illustration of a smart grid architecture in accordance with the present disclosure.

FIG. 1 illustrates an infrastructure assessment system 100 in accordance with embodiments of the present disclosure integrated in a smart grid infrastructure 102. A typical configuration of the smart grid infrastructure 102 is a three-layered hierarchical structure, similar to what is depicted in FIG. 1.

A prosumer device layer 122 may be viewed as producers of data within the smart grid infrastructure 102. This layer hosts all classes of prosumer devices 132, 134, 136, including strictly consuming devices and strictly producing devices as well as devices that consume and produce. Prosumer device 132-136 may be complex devices or entire systems. Prosumer devices 132-136 may include sufficient computing capacity and communication capability in order to communicate data (whether wirelessly or wired) to higher layers 124, 126 in the smart grid infrastructure 102. Illustrative examples of strictly consuming devices include household appliances. For example, a washing machine may be able to report data to the smart grid infrastructure 102 about its electricity consumption and water consumption. An electric meter may be able to report data to the smart grid infrastructure 102 about electricity consumed by the household, and so on. An illustrative example of a prosumer device is the electric car, which consumes electricity when accelerating and produces electricity when braking. Solar cells are an example of a strictly producing device.

Prosumer devices 132-136 may report data to the higher layers 124, 126 in the smart grid infrastructure 102. The data may include resource consumption rates (e.g., electricity, water, etc.), resource production rates (e.g., electricity), and so on. The data may be communicated to an information processing layer 124 or directly to an enterprise services layer 126. The data may be encrypted or communicated over a private or otherwise secured communication channel such as illustrated by prosumer devices 136. Household electric smart meters, for example, typically send their data in a secured way in order to preserve the privacy of the household.

A prosumer device 136 may be gateway, a mediator, or any other physical or non-physical (virtual/proxy) device. Other prosumer devices 132, 134 may send their data in plaintext over an open communication channel such as the Internet, or may employ some intermediate level of security.

The smart grid infrastructure 102 may include an information processing layer 124 to which devices in the prosumer device layer 122 communicate. FIG. 1, for example, shows that devices 134, 136 communicate with the information processing layer 124. The information processing layer 124 may serve as a gateway for data gathered from prosumer devices 134, 136, and may serve to handle proprietary protocols, to improve performance, to perform preprocessing, to accommodate infrastructure restrictions, and so on. The information processing layer 124 may include information concentrators 142, 144 to facilitate communications with the prosumer devices 134, 136. Concentrators 142, 144 may aggregate, filter, or otherwise process data collected from the prosumer devices 134, 136. For example, some prosumer devices 136 may employ a proprietary communication protocol. Concentrator 144 may be configured to handle the proprietary protocol. The information concentrators 142, 144 may aggregate the data or perform domain-specific analytics, and so on. Collected data may be pre-filtered before being passed on higher layers in the smart grid infrastructure 102. Other such data pre-processing functions may be performed by the information processing layer 124 depending on the requirements of the higher layers in the smart grid infrastructure 102 such as the enterprise services layer 126.

The enterprise services layer 126 may provide services to various business processes 128*a*, 128*b*, 128*c* that depend on the real-world data supported by the smart grid infrastructure 102. Business processes 128*a*, 128*b*, 128*c* may be steps within a larger process, a set of distributed processes, and so on. A system in the enterprise services layer 126 might be a metering data unification system, for example, to provide services such as billing. The enterprise services layer 126 may receive data from the information processing layer 124. Data may be received directly from the prosumer device layer 122 as well. The enterprise services layer 126 provides services to business processes 128*a*, 128*b*, 128*c*, which may be deemed consumers of data produced in the smart grid infrastructure 102. Services provided by the enterprise service layer 126 may be distributed over a cloud infrastructure.

In accordance with principles of the present disclosure, an infrastructure assessment system 100 may be integrated into the smart grid infrastructure 102. The infrastructure assessment system 100 may collect real-time data from the smart grid infrastructure 102. The infrastructure assessment system 100 may assess the general health of the smart grid infrastructure 102 and deploy maintenance and other management services into the smart grid infrastructure based on its assessment. In some embodiments, the integration of the infrastructure assessment system 100 into the smart grid infrastructure 102 may include one or more communication channels 112, 114, 116. The infrastructure assessment system 100 may collect data from the enterprise services layer 126 over communication channel 112. Data may also be collected directly from the lower layers 124, 122. For example, data collected from the information processing layer 124 (e.g., via communication channel 114) may provide a more granular view into the health of the smart grid infrastructure 102. Data collected directly from the prosumer devices 132-136 (e.g., over communication channel 116) may deemed as being the "raw" data that feeds into the smart grid infrastructure 102, and thus may provide the highest resolution view of the smart grid infrastructure.

Figure 2:
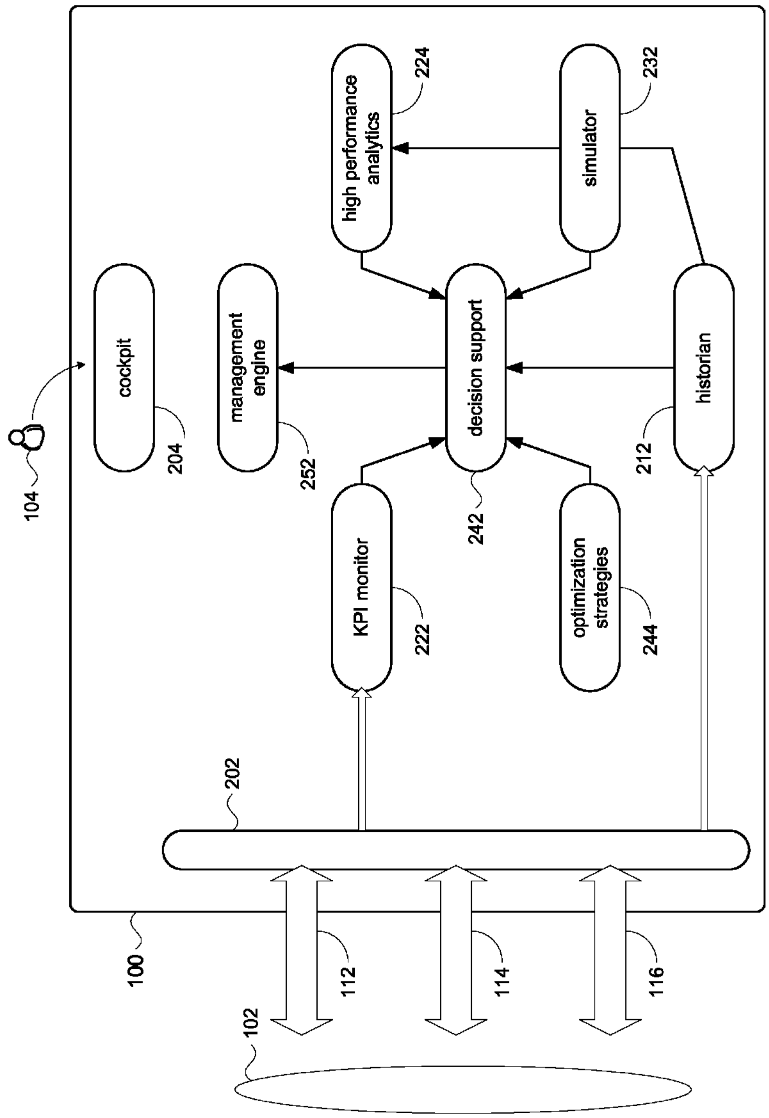
FIG. 2 is a system block diagram of an illustrative embodiment of an infrastructure assessment system (for monitoring and management).

Referring to FIG. 2, an illustrative embodiment of an infrastructure assessment system 100 in accordance with the present disclosure may comprise several components. It is noted that the components may be interconnected in many ways and that the figure highlights only some of those connections.

The infrastructure assessment system 100 may include a receiver module 202 which serves as an interface to the "data sources" in the smart grid infrastructure 102 to collect data from the smart grid infrastructure. The collected data may include data collected from the enterprise services layer 122, the information processing layer 124, and individual prosumer devices 132-136 in the prosumer devices layer 126. In some embodiments, the receiver module 202 may comprise suitable communication facilities, both hardware and software, to enable communication with the enterprise services layer 126, the information processing layer 124, and the prosumer devices 132-136 in the prosumer device layer 122. For example, communication with the enterprise layer 126 and the information processing layer 124 may call for a suitable Internet connection. Communications may be secured, for example HTTPS may be used over a web connection. Communication with prosumer devices 132-136 may require specialized hardware (e.g., radio communication equipment) and/or special software (e.g., private communication protocol, encryption, etc.), depending on the prosumer device. The data collected by the receiver module 202 may be deemed real-time data because, for example, data from the prosumer devices 132-136 can be collected as it is being generated.

The infrastructure assessment system 100 may include a cockpit module 204, which may serve as a direct interface for users 104 of the infrastructure assessment system. The cockpit module 204 may serves as an entry point to access the data and services provided by the infrastructure assessment system 100. In some embodiments, the various modules in the infrastructure assessment system 100 (e.g., modules 212, 222, 224, 232, 242, 244, and 256) may be configured to operate as separate sub-systems or processes, and thus may be viewed as independent data sources in the infrastructure assessment system. Accordingly, the cockpit 204 may be a mash-up application that combines information from these different data sources to re-present the data and offer specialized services to the user. Several different instances of the cockpit module 204 may thus be customized for different business users depending on their area of interest. For instance, an energy provider may want a cockpit mash up to monitor energy consumption on the network and get an alarm when energy consumption exceeds a limit or a device has not reported any meter readings for a specific amount of time. A maintenance user may want a cockpit mash up to monitor the performance of smart meters deployed in the smart grid infrastructure 102 and be alerted when performance levels (e.g., data reporting rate) falls below a threshold.

Figure 2A:
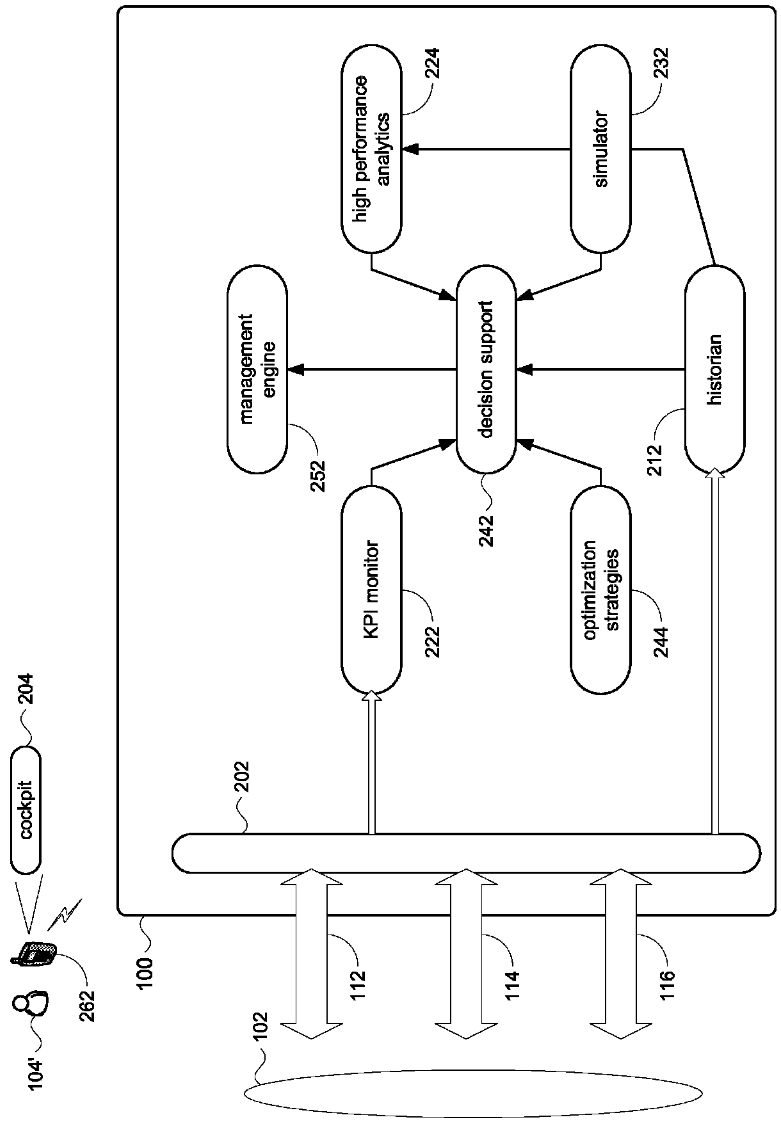
FIGS. 2A and 2B illustrate alternate embodiments, showing different configurations of the cockpit module.

As shown in FIG. 2A, the cockpit module 204 may an application (e.g., a mash up) executing on a mobile device 262 such as a smart phone or a computing tablet. Data sources in the infrastructure assessment system 100 (e.g., modules 212, 222, 224, 232, 242, 244, and 256) may be configured with suitable web services interfaces, allowing the cockpit module 204 to access their data and otherwise interact with them from the mobile device. The infrastructure assessment system 100 may thus serve as a back-end system, allowing mobile users 104' to access the infrastructure assessment system from their mobile devices (e.g., 262) while they are in the field.

Figure 2B:
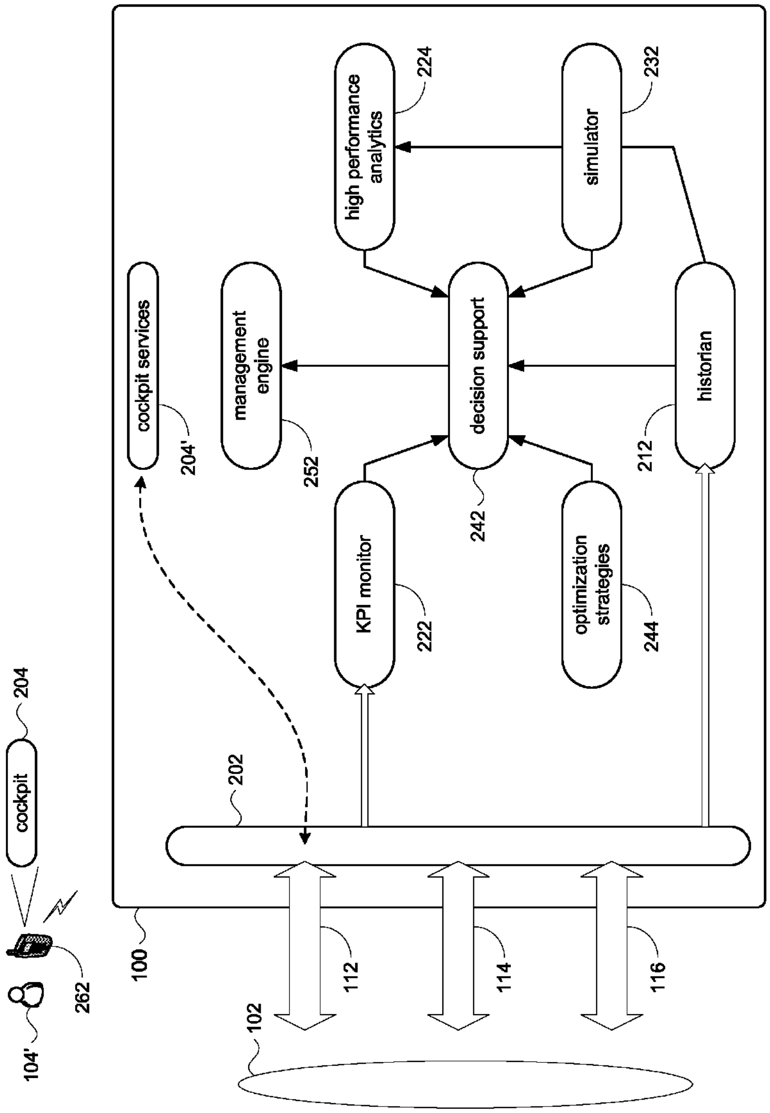

As shown in FIG. 2B, in some embodiments, the infrastructure assessment system 100 may include a cockpit services module 204', such as a web services interface, to serve as a single point of access to the data sources in the infrastructure assessment system. The cockpit module 204 in the mobile devices may interface with the cockpit services module 204'. In some embodiments, the cockpit service module 204' may be configured to communicate with the enterprise services layer 126, giving the enterprise services layer access to the infrastructure assessment system 100. The enterprise services layer 126 may be allowed to configure which aspects of the smart grid infrastructure 102 should be monitored, the quality of the expected information, and so on. In addition, configurations may be customized on a per business process basis. Although the cockpit service module 204' may serve as a convenient access of services, in other embodiments, the individual modules of the infrastructure assessment system 100 may provide their respective services directly to the user 104' instead.

Returning to FIG. 2, a key performance index (KPI) monitor 222 manages and monitors KPI's. KPI's represent operational metrics or parameters of the smart grid infrastructure 102 and thus may reflect how well the smart grid infrastructure is behaving. The KPI's may be used to establish a minimum level of requirements for the smart grid infrastructure 102. Typical KPI's might include communication metrics, computation statistics, load limits and balancing, network path utilization, congestion, application logic, etc. In the case of smart metering, for instance, typical considerations may include:

- impact of security: channel vs. message encryption, firewall inspections, etc.
- level of meter reading aggregation
- preprocessing of meter readings at meter, concentrator or network level
- impact of channel communication quality e.g. latency, packet loss, throughput, retransmission
- metering data system performance (application processing, data validation, DB performance etc.)
- load management/balancing
- cost (including lifecycle management of software and hardware)
- risk analysis, resiliency
- business process constraints integration
- business process design-phase integration of asset management A user (human user, enterprise services layer 126) may access services provided by the KPI monitor 222 to define the KPI's of interest. The user may define how often KPI's get updated, and so on. The KPI monitor 222 may receive incoming data collected by the receiver module 202 and update the KPI's using the collected data. In this way, the KPI monitor 222 may provide a continuous monitoring of an aspect of the health of the smart grid infrastructure 102.

A historian 212 receives data collected by the receiver module 202, and accumulates a historical record of the collected data. In some embodiments, the historian 212 may accumulate data collected from the enterprise services layer 122, the information processing layer 124, and data from individual prosumer devices 132-136. The historian 212 may comprise any suitable data storage and management system such as a high performance database system. The historian 212 may be accessed by other components of the infrastructure assessment system 100. The historian 212 may provide data to external systems. For example, an auditing system (not shown) may access the historical data maintained by the historian 212 to conduct audits of the smart grid infrastructure 102.

The collected data may be subject to various analytics. The monitoring of KPI's by the KPI monitor 222 may include computations performed on the incoming data received by the receiver module 202. An analytics module 224 may provide a suite of analytical tools to allow a user to define a broader range of analyses on the data collected by the receiver module 202. The analytics module 224 may perform the defined analytics on the incoming data (e.g., real time analytics). In addition, the analytics module may perform various analyses on the historical data maintained by the historian 212 (e.g., trend analysis). Example analytics may include technical analysis (e.g., statistics of deployed smart meters or software etc.), real-time view and statistics on energy production/consumption/estimation, data mining, business relevant aspects (e.g., a cost-benefits analysis, etc.), risk, security and fraud analytics, behavioral/social analytics, etc.

A simulator 232 may run simulations and emulations of the smart grid infrastructure 102 and services provided by the smart grid infrastructure such as monitoring energy consumption and production, forecasting energy consumption and production, managing users and devices, optimizing distribution of energy, and so on. The simulator 232 may comprise tools for developing simulation models for various aspects of the smart grid infrastructure 102. Simulation models may include modeling the physical configuration of the smart grid infrastructure 102. For example, in an electrical grid, households, businesses, and other consumers of electricity may be modeled according to the deployment of electrical distribution stations to model the delivery of electricity to end users in the smart grid infrastructure 102. Usage models may be developed to model electricity demands under different conditions (e.g., time of year, disaster scenarios, etc.). Simulation models may include the enterprise services layer 126 and the information processing layer 124, for example, to model the flow of data within the smart grid infrastructure 102 when services are being performed. And so on.

A decision support module 242 facilitates identifying and developing action items to be performed on the smart grid infrastructure 102. In some embodiments, the decision support module 242 may provide tools to assist the user in conducting what-if scenarios on the smart grid infrastructure 102. The user may employ data from the KPI monitor 222, data from the analytics module 224, and simulation results from the simulator 232 to drive the what-if scenarios. In addition, historical data managed by the historian 212 may feed into the what-if scenarios. What-if scenarios may be used, for example, to assess new functionality to be introduced into the network, to run "experiments' on scalability strategies for better overall performance, and so on.

In some embodiments, the decision support module 242 may operate in a monitoring mode. For example, the simulator 232 may feed some of its simulation results into the decision support module 242. The simulator 232 may generate predicted performance measures of the smart grid infrastructure 102. The performance measures may be input to the decision support module 242 to compare against actual behavior of the smart grid infrastructure 102. Data from the KPI monitor 222 and data from the analytics module 224 may be used to establish the actual behavior of the smart grid infrastructure 102, for example. Based on comparing actual behavior versus simulated behavior, the decision support module 242 may trigger certain action items in order to bring simulations of the smart grid infrastructure and actual performance into alignment. Action items may be performed on the smart grid infrastructure 102 to align the performance of the smart grid infrastructure in accordance with simulations. The action items may include modifying simulation models to more closely match reality. In some embodiments, the user may provide input to guide the decision as the selection of action items.

An optimization strategies module 244 may include a library of optimization strategies to optimize certain behavior in the smart grid infrastructure 102, or to achieve certain goals set by the user. The decision support module 242 may incorporate these optimization strategies to guide the decision process of identifying action items to be taken. In some embodiments, the user may inform the decision support module 242 by selecting a desired strategy. Different strategies by different groups may apply to a given situation. Sometimes strategies from one group (e.g., a business group) may conflict with strategies from another group (e.g., a maintenance group). Accordingly, user interaction may be required to resolve conflicts when the decision support module 242 encounters conflicting strategies. As a result an "optimized" strategy may comprise action items that were negotiated among several groups in the organization or with interactions with external groups.

As an example, a local utility may run a strategy to optimize the energy consumption by adjusting the tariffs in real-time (maximize benefit). However, this might be in conflict with an existing running process that tries to optimize the infrastructure for maintenance (hence minimize usage and communication). Similar conflicts might arise if contradicting policies are given within the same organization or vastly different goals among different users (which may be not be in the same domain as several instances of this system may run). Here, it is assumed that such potential conflicts and negotiations are handled by the users, in the DSS itself, or with external help (e.g. negotiation with other systems).

In some embodiments, a management engine 252 may cooperate with the decision support module 242 to manage the smart grid infrastructure 102 in accordance with decisions made by the decision support module. The management engine 252 may dispatch action items decided upon by the decision support module. For example, the decision support module 242 may identify an action item to conduct an installation of smart meters in a region in order to improve data gathering capacity in that region. The decision support module 242 may communicate the action item to the management engine 252, which may then issue a work order to a maintenance crew to initiate the installation effort. The management engine 252 may be invoked directly by a user to perform some activity in the smart grid infrastructure 102.

Figure 3:
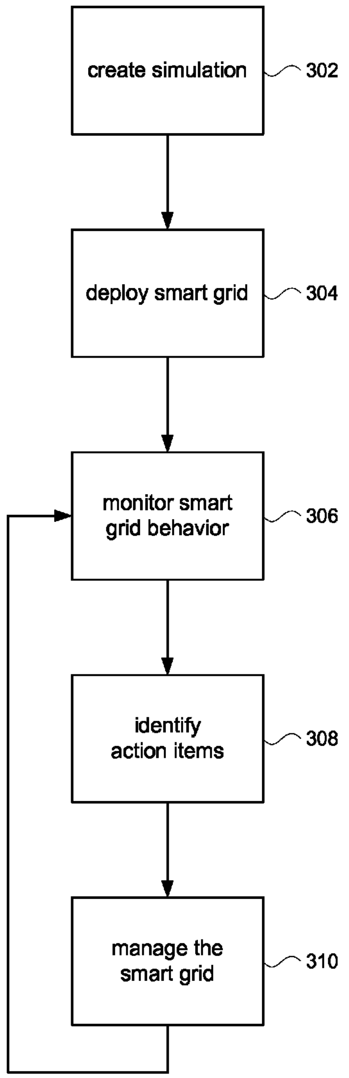
FIG. 3 is a process flow illustrating the role of an infrastructure assessment system in a pre-deployment scenario.

FIG. 3 illustrates a process flow in accordance with the principles of the present disclosure. In some embodiments, the infrastructure assessment system 100 can be utilized in the decision-making and design process prior to deployment of a smart grid in order to assess cost, performance, and behavior. Thus, in a step 302 a design group may develop simulation models to model the desired behavior of the to-be-deployed smart grid using the simulator 232. Desired KPI's may be determined (e.g., smart metering performance, scalability of the smart grid, etc.) and incorporated into the simulation models. In this step, different near real world conditions and configurations can be tried out and assessed prior to any real world deployment. The functionality exposed by the simulator 232 may be integrated into business process modeling tools to extend simulations into the business side of the smart grid.

In a step 304, the smart grid and infrastructure/systems may be deployed. This step may occur in several phases over a period of many years. In a step 306, the infrastructure assessment system 100 may be used to monitor the smart grid and to detect deviations from expected behavior after the smart grid is built. The infrastructure assessment system 100 may predict the behavior expected from the real infrastructure using the simulator 232. The infrastructure assessment system 100 may then subsequently measure the behavior and note any significant deviations between the simulation model and the real world. Such deviations may for instance imply unforeseen conditions, simulation model inadequacy or misbehavior at infrastructure level. A typical example might be identifying electricity loss or theft. Step 306 may include monitoring the KPI's using the KPI monitor 222 and computing additional analytics using the analytics module 224. The simulation models developed in step 302 may be run to make predictions about expected KPI's and other performance metrics.

In a step 308, the decision support module 242 may use the collected data and the various computed data to decide upon action items to be performed on the smart grid. In a step 310, the smart grid may be managed, for example, by one or more management engines 252 dispatching action items determined in step 308. As an example, suppose a metering performance KPI such as "data points collected" for a given region in the smart grid has fallen below predetermined thresholds or if the quality of data coming from a device or system degrades, the decision support system 242 may initiate a predictive maintenance analysis and identify potential malfunctioning risks. A follow-up action item might be to create an action, such as "send out repair crew". The action item may be communicated to a management engine 252, which may then generate a work order to send out a repair crew to inspect a number of the meters in that area (e.g., using an optimized repair schedule to reduce downtime, cost, and the like).

The steps 306-310 may be repeated to create a monitor/manage loop. It will be appreciated that this loop may be performed at each phase during the deployment of the smart grid. For example, the simulation models may be updated as each phase of the deployment is monitored and its actual behavior is measured and compared against the simulation models. Subsequent phases of the deployment may be altered to based on results of monitoring previous phases of the deployment. By supporting a closed loop of monitoring and control/management, the user can perform self-examination activities such as self-healing and self-optimizing, both of which can be important to the health of the smart grid infrastructure 102.

Figure 4:
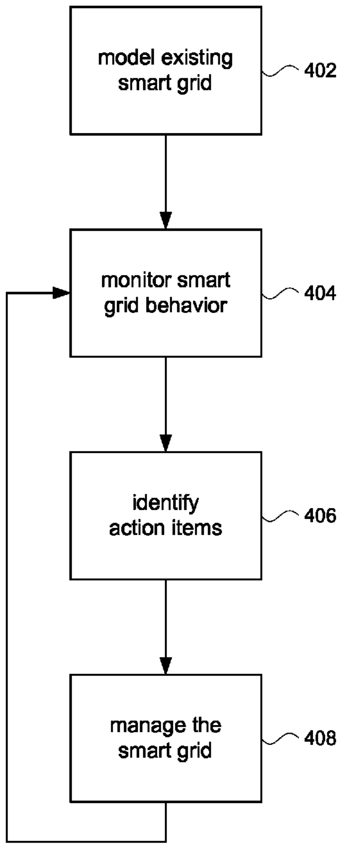
FIG. 4 is a process flow illustrating the roll of an infrastructure assessment system in an existing smart grid deployment.

FIG. 4 illustrates another process flow in accordance with principles of the present disclosure. In some embodiments, the infrastructure assessment system 100 may be integrated into an existing smart grid. Thus, in a step 402 the existing smart grid may be modeled using tools provided by the simulator 232. KPI's may be defined using the KPI monitor 222, for example, to identify a baseline of performance metrics that indicate how well the existing smart grid is behaving.

In a step 404, the infrastructure assessment system 100 may be operated to monitor the existing smart grid. The KPI monitor 222 may update the KPI's as data is collected by the receiver component 202. The simulator 232 may perform simulations on the models developed in step 402, and so on. In a step 406, the decision support module 242 may use the collected data and the various computed data (including simulation results) to make decisions on action items to be performed on the existing smart grid. In a step 408, the existing smart grid may be managed, for example, by the management engine 252 dispatching the action item determined in step 406. An output might also be given, for example, to a recommendation system or evaluation of the specific model or algorithm so that it can optimize its behaviour in the future. The steps 404-408 may be repeated to create a monitor/manage loop.

Figure 5:
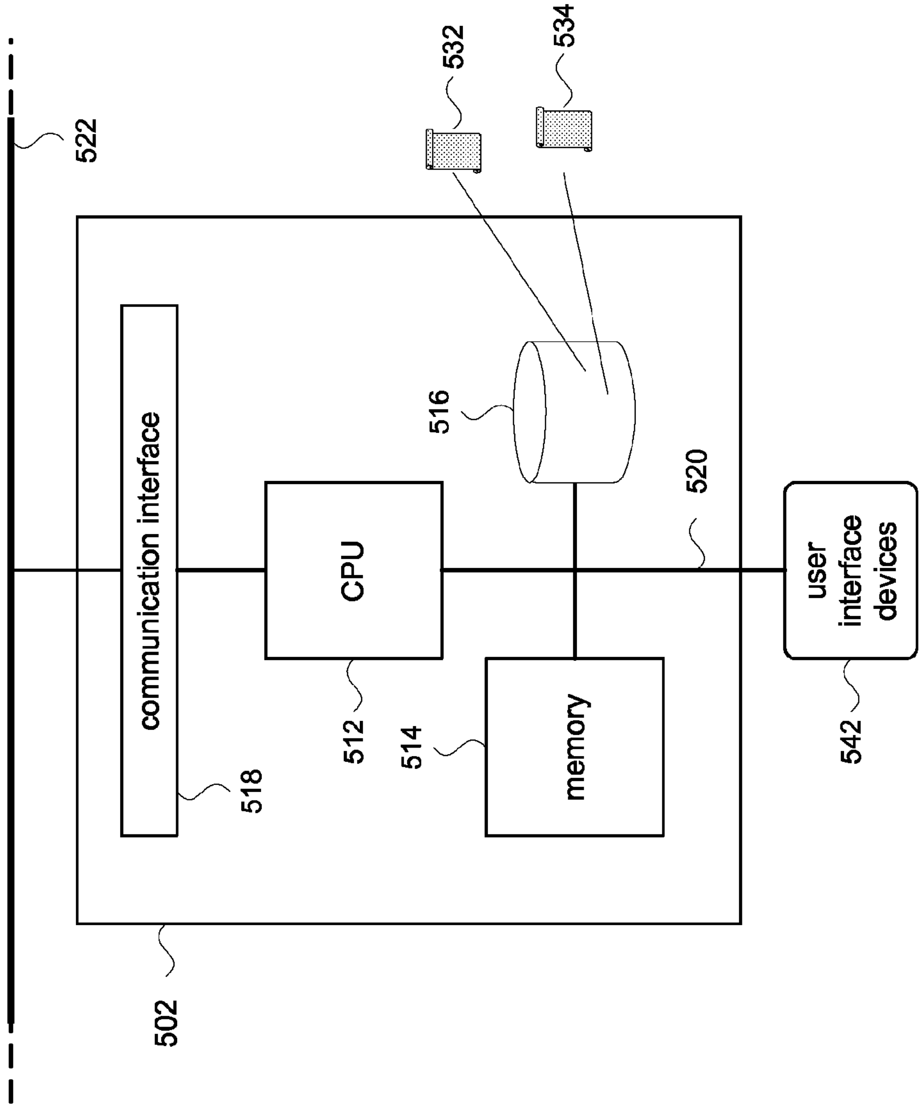
FIG. 5 shows an example of a computer system configured according to the present disclosure.

A particular embodiment of the infrastructure assessment system 100 in accordance with the present disclosure is illustrated in FIG. 5, showing a high level block diagram of a computer system 502 configured to operate in accordance with the present disclosure. The computer system 502 may include a central processing unit (CPU) or other similar data processing component, which may comprise one or multiple processing units, clusters of CPUs, etc. The computer system 502 may include various memory components. For example, the memory components may include a volatile memory 514 (e.g., random access memory, RAM, virtual memory system, etc.) and a data storage device 516. The data storage device 516 may be distributed storage system and not necessarily collocated with the rest of the computer system 502. One or more communication interfaces 518 may be provided to allow the computer system 502 to communicate over a wired or wireless communication network 522, such as a local area network (LAN), the Internet, and so on. In general, any protocol over the specific communication network can be used. An internal system of busses for control and communication 520 may interconnect the components comprising the computer system 502.

The data storage device 516 may comprise a non-transitory computer readable medium having stored thereon computer executable program code 532. The computer executable program code 532 may be executed by the CPU 512 to cause the CPU to perform steps of the present disclosure, for example, as set forth in the description of FIG. 2. The data storage device 516 may store data 534 such as the KPI's, simulation results from the simulator 232, results of analytics produced by the analytics module 224, and so on. In some embodiments, the storage device 516 may comprise several storage sub-systems. The historian 212 may accumulate historical data in a separate storage sub-system, for example.

A user (e.g., 104) may interact directly with the computer system 502 using suitable user interface devices 542 such as the cockpit 204, or indirectly since the system's functionality may be part of complex functionality provided at higher levels in the system. They may include, for example, input devices such as a keyboard, a keypad, a mouse or other pointing device, and output devices such as a display. Alternative input and output devices are contemplated of course. The interface device 542 may be a mobile device.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

The infrastructure assessment system 100 according to principles of the present disclosure can achieve:

- real-time infrastructure performance management: monitoring, assessment and control
- simulation and estimation of infrastructure behavior (including services)
- complexity management for end-users based on cross-layer (e.g., enterprise services layer 126, information processing layer 124, and prosumer devices layer 122) data computation and real-time analytics The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer implemented method for assessing an infrastructure for a smart grid comprising:

a receiver module collecting data from the smart grid;

a decision support module;

a KPI module receiving user input to define one or more key performance indicators (KPI's) of the infrastructure, receiving data from the receiver module to monitor defined KPI's, and providing performance data directly to the decision support module;

an analytics module receiving data from the KPI module, performing real-time analytics using the data received therefrom, and providing analytical results directly to the decision support module; and a simulator module receiving data from the receiver module, performing simulations on models of the infrastructure and models of services provided by the infrastructure, and providing simulation results directly to the decision support module, the decision support module receiving data directly from the KPI module, the analytics module, and the simulator module, and determining a plurality of actions to be performed on the infrastructure based on the data received.

2. The computer implemented method of claim 1 wherein collecting the data includes receiving data from an enterprise service layer.

3. The computer implemented method of claim 1 wherein collecting the data includes receiving data from an information processing layer in the smart grid which collects data from a plurality of prosumer devices in the smart grid and produces data that is forwarded on to an enterprise service layer.

4. The computer implemented method of claim 1 wherein collecting the data includes receiving data directly from a plurality of prosumer devices in the smart grid.

5. The computer implemented method of claim 1 wherein determining a plurality of actions is based on actual behavior of the infrastructure and the simulations of the infrastructure are determined for different layers of the infrastructure.

6. The computer implemented method of claim 1 wherein determining a plurality of actions is based on optimization strategies that comprise action items negotiated among separate groups in an organization or among different organizations.

7. The computer implemented method of claim 6 further comprising receiving input from a user that comprise the optimization strategies that are in effect.

8. The computer implemented method of claim 1 further comprising receiving conflict resolution input from a user when the plurality of actions are in conflict with each other.

9. A computer system comprising:

a data processor;

a data storage system; and computer executable program code which, when executed by the data processor, causes the data processor to function as:

a receiver module that collects data from the smart grid;

a decision support module;

a KPI module that receives user input to define one or more key performance indicators (KPI's) of the infrastructure, receive data from the receiver module to monitor defined KPI's, and provide performance data directly to the decision support module;

an analytics module that receives data from the KPI module, performs analytics using the data received therefrom, and provides analytical results directly to the decision support module;

a simulator module that receives data from the receiver module, performs simulations on models of the infrastructure and models of services provided by the infrastructure, and provides simulation results directly to the decision support module, the decision support module receiving data directly from the KPI module, the analytics module, and the simulator module to determine a plurality of actions to be performed on the infrastructure based on the data received.

10. The computer system of claim 9 wherein the data processor collects the data by receiving data from an enterprise service layer.

11. The computer system of claim 9 wherein the data processor collects the data by receiving data from an information processing layer in the smart grid which collects data from a plurality of prosumer devices in the smart grid and produces data that is forwarded on to an enterprise service layer.

12. The computer system of claim 9 wherein the data processor collects the data by receiving data directly from a plurality of prosumer devices in the smart grid.

13. The computer system of claim 9 wherein the plurality of actions determined is based on actual behavior of the infrastructure and the simulations of the infrastructure are determined for different layers of the infrastructure.

14. The computer system of claim 9 wherein the plurality of actions determined is based on optimization strategies comprise action items negotiated among separate groups in an organization.

15. The computer system of claim 14 wherein the computer executable program code further causes the data processor to receive input from a user that comprise the optimization strategies that are in effect.

16. The computer system of claim 9 wherein the computer executable program code further causes the data processor to receive conflict resolution input from a user when the plurality of actions are in conflict with each other.

17. A non-transitory computer readable storage medium having stored thereon computer executable program code configured to cause a computer system to perform steps of:

a receiver module collecting data from the smart grid;

a decision support module;

a KPI module receiving user input to define one or more key performance indicators (KPI's) of the infrastructure, receiving data from the receiver module to monitor defined KPI's, and providing performance data directly to the decision support module;

an analytics module receiving data from the KPI module and a historian module, performing analytics using the data received therefrom, and providing analytical results directly to the decision support module;

a simulator module receiving data from the receiver module and the historian module, performing simulations on models of the infrastructure and models of services provided by the infrastructure, and providing simulation results directly to the decision support module, the decision support module receiving data directly from the KPI module, the analytics module, and the simulator module, and determining a plurality of actions to be performed on the infrastructure based on the data received.

18. The non-transitory computer readable storage medium of claim 17 wherein collecting the data includes receiving data from an enterprise service layer.

19. The non-transitory computer readable storage medium of claim 17 wherein collecting the data includes receiving data from an information processing layer in the smart grid which collects data from a plurality of prosumer devices in the smart grid and produces data that is forwarded on to an enterprise service layer.

20. The non-transitory computer readable storage medium of claim 17 wherein collecting the data includes receiving data directly from a plurality of prosumer devices in the smart grid.

* * * * *